United States Patent
Chang et al.

(10) Patent No.: US 9,285,939 B2
(45) Date of Patent: Mar. 15, 2016

(54) TOUCH PANEL

(71) Applicants: Ting-Yu Chang, Kaohsiung (TW);
Chong-Wei Li, Changhua County (TW);
Ching-Fu Hsu, Taichung (TW);
Chen-Ho Hsu, Kaohsiung (TW)

(72) Inventors: Ting-Yu Chang, Kaohsiung (TW);
Chong-Wei Li, Changhua County (TW);
Ching-Fu Hsu, Taichung (TW);
Chen-Ho Hsu, Kaohsiung (TW)

(73) Assignee: WINTEK CORPORATION, Taichung (TW)

(*) Notice: Subject to any disclaimer, the term of this patent is extended or adjusted under 35 U.S.C. 154(b) by 0 days.

(21) Appl. No.: 14/494,608

(22) Filed: Sep. 24, 2014

(65) Prior Publication Data

US 2015/0083569 A1    Mar. 26, 2015

(30) Foreign Application Priority Data

Sep. 24, 2013 (TW) .............................. 102134306 A

(51) Int. Cl.
*H03K 17/96* (2006.01)
*G06F 3/044* (2006.01)

(52) U.S. Cl.
CPC ..................................... *G06F 3/044* (2013.01)

(58) Field of Classification Search
CPC ................... Y10T 29/49117; Y10T 49/49105; G06F 3/044; G06F 2203/04103; H01H 1/00; H01H 13/70; H01H 2239/074; H01H 2203/008; H01H 2207/01; H01H 2221/00; H01H 2231/002; H01H 2231/012; H01H 2231/016; H01H 2231/052; H01H 2239/006; H03K 17/9622; H03K 17/962; H03K 2217/960755
USPC .............................. 200/5 R, 600; 29/622, 825
See application file for complete search history.

(56) References Cited

U.S. PATENT DOCUMENTS

| | | | | |
|---|---|---|---|---|
| 8,686,308 B2* | 4/2014 | Kuriki | ..................... | G06F 3/044 200/512 |
| 8,698,029 B2* | 4/2014 | Scuderi | ................... | G06F 3/044 200/600 |
| 2008/0142352 A1* | 6/2008 | Wright | ................... | G06F 3/044 200/600 |
| 2012/0312677 A1* | 12/2012 | Kuriki | ..................... | G06F 3/044 200/600 |

* cited by examiner

*Primary Examiner* — Edwin A. Leon
(74) *Attorney, Agent, or Firm* — Ming Chow; Sinorica, LLC

(57) ABSTRACT

A touch panel including a substrate, a touch-sensing element, transmission lines, a ground electrode, a first electrode layer, an insulation layer and a second electrode layer is provided. The transmission lines are electrically connected to the touch-sensing element. The ground electrode surrounds the touch-sensing element and the transmission lines. The first electrode layer is located around and electrically connected to the ground electrode. The insulation layer is at least disposed on the first electrode layer. The second electrode layer is disposed on the insulation layer to form at least one capacitance storage unit, so that the electro static discharge can be conducted to the ground electrode through the capacitance storage unit.

15 Claims, 7 Drawing Sheets

TOUCH PANEL

CROSS-REFERENCE TO RELATED APPLICATION

This application claims the priority benefit of Taiwan application serial no. 102134306, filed on Sep. 24, 2013. The entirety of the above-mentioned patent application is hereby incorporated by reference herein and made a part of this specification.

BACKGROUND OF THE INVENTION

1. Field of the Invention

The present invention relates to a touch panel. More particularly, the present invention relates to a touch panel having a favorable capability of electrostatic discharge (ESD) protection.

2. Description of Related Art

Generally, during the manufacturing process of the touch panel, a ground electrode is fabricated in the periphery area of the touch panel to surround the transmission lines. The ground electrode is a metal line with a relatively large line width such that the ground electrode can effectively reduce the external noise which affects the internal electronic signal of the touch panel. However, the instantaneous current usually fails to be dissipated and thus accumulates at the ground electrode which may lead to a damage of the touch panel due to the electro static discharge is conducted to the touch-sensing element.

SUMMARY OF THE INVENTION

The present invention provides a touch panel having a favorable capability of electrostatic discharge protection.

The present invention provides a touch panel including a substrate, a touch-sensing element, a plurality of transmission lines, a ground electrode, a first electrode layer, an insulation layer and a second electrode layer. The touch-sensing element is disposed on the substrate. The transmission lines are disposed on the substrate and electrically connected to the touch-sensing element. The ground electrode is disposed on the substrate and surrounds the touch-sensing element and transmission lines. The first electrode layer is disposed on the substrate and located around the ground electrode. The first electrode layer is electrically connected to the ground electrode. The insulation layer is at least disposed on the first electrode layer. The second electrode layer is disposed on the insulation layer. The second electrode layer, the insulation layer and the first electrode layer form at least one capacitance storage unit, so that an electro static discharge can be conducted to the ground electrode through the capacitance storage unit.

According to an exemplary embodiment of the present invention, the first electrode layer has an annular shape.

According to an exemplary embodiment of the present invention, the second electrode layer has an annular shape.

According to an exemplary embodiment of the present invention, the second electrode layer includes a plurality of second electrodes.

According to an exemplary embodiment of the present invention, the first electrode layer includes a plurality of first electrodes.

According to an exemplary embodiment of the present invention, the second electrode layer includes a plurality of second electrodes. The second electrodes correspond to the first electrodes.

According to an exemplary embodiment of the present invention, the material of the first electrode layer and the second electrode layer includes metal, alloy, a metal stacked layer, an alloy stacked layer, metal oxide or any combination thereof According to an exemplary embodiment of the present invention, the touch-sensing element includes a plurality of first electrode series and a plurality of second electrode series. Each of the first electrode series includes a plurality of first touch electrodes and a plurality of first connecting lines connecting the first touch electrodes in a series along a first direction. Each of the second electrode series includes a plurality of second touch electrodes and a plurality of second connecting lines connecting the second touch electrodes in a series along a second direction. The first direction intersects with the second direction. The second connecting lines and the first connecting lines are insulated from each other.

According to an exemplary embodiment of the present invention, the first connecting lines are disposed on the second connecting lines.

According to an exemplary embodiment of the present invention, the first electrode layer, the first touch electrodes, the second touch electrodes and the second connecting lines belong to the same layer, and the second electrode layer and the first connecting lines belong to the same layer.

According to an exemplary embodiment of the present invention, the first connecting lines are disposed on the substrate.

According to an exemplary embodiment of the present invention, the first electrode layer and the first connecting lines belong to the same layer, and the second electrode layer, the first touch electrodes, the second touch electrodes and the second connecting lines belong to the same layer.

According to an exemplary embodiment of the present invention, the first electrode series and the second electrode series are made of metallic material.

According to an exemplary embodiment of the present invention, the first touch electrodes and the second touch electrodes are mesh electrodes.

According to an exemplary embodiment of the present invention, the touch panel further includes a decoration layer, and an orthographic projection area of the first electrode layer, the ground electrode and the transmission lines on the substrate is overlapped with an orthographic projection area of the decoration layer on the substrate.

In light of the above, the touch panel of the embodiment of the present invention can store and conduct the electro static discharge to the ground electrode through the capacitance storage unit formed by the first electrode layer, the insulation layer and the second electrode layer, so as to prevent the instantaneous current from being directly impacted on the ground electrode which may lead the ground electrode can not immediately transmitted out a large amount of the electro static discharge, and then damage the touch panel. According to this, the touch panel of the present invention can have a better function of conducting the electro static discharge.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
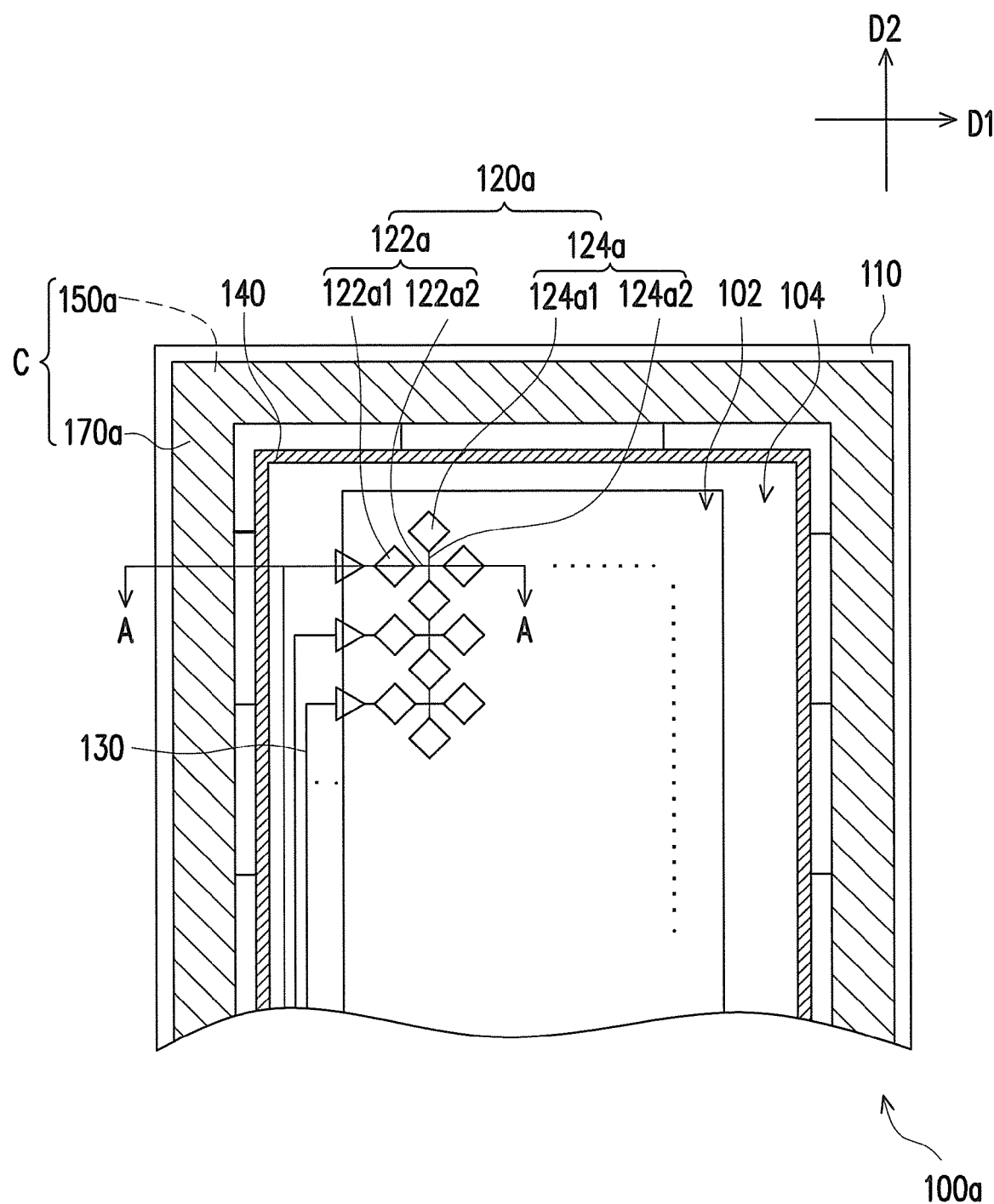
FIG. 1A is a schematic top view of a touch panel according to an embodiment of the invention.
Figure 1B:
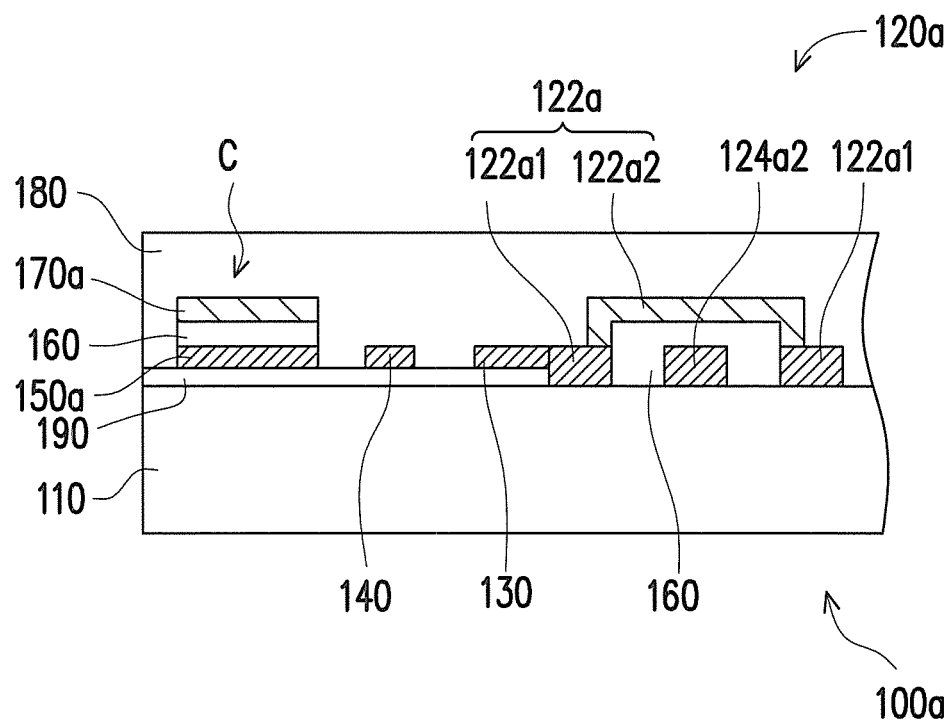
FIG. 1B is a cross-sectional view of the touch panel depicted in FIG. 1A along a line A-A.

FIG. 1A is a schematic top view of a touch panel according to an embodiment of the invention. FIG. 1B is a cross-sectional view of the touch panel depicted in FIG. 1A along a line A-A. For the convenience of explanation, illustrations of some components are omitted in FIG. 1A. Please refer to both FIG. 1A and FIG. 1B, in this embodiment, the touch panel 100a includes a substrate 110, a touch-sensing element 120a, a plurality of transmission lines 130, a ground electrode 140, a first electrode layer 150a, an insulation layer 160 and a second electrode layer 170a. The touch panel 100a has a light transmitting area 102 and a periphery area 104 surrounded the light transmitting area 102, wherein the touch-sensing element 120a is at least located in the light transmitting area 102, and the transmission lines 130, the ground electrode 140, the first electrode layer 150a and the second electrode layer 170a are all located in the periphery area 104.

In detail, the touch-sensing element 120a is disposed on the substrate 110. The transmission lines 130 are disposed on the substrate 110 and electrically connected to the touch-sensing element 120a. The ground electrode 140 is disposed on the substrate 110 and surrounds the touch-sensing element 120a and the transmission lines 130. The first electrode layer 150a is disposed on the substrate 110 and located around the ground electrode 140. The first electrode layer 150a is electrically connected to the ground electrode 140. The first electrode layer 150a, the insulation layer 160 and the second electrode layer 170a are sequentially stacked and disposed on the substrate 110 so as to faun a capacitance storage unit C, and thereby an electro static discharge can be conducted to the ground electrode 140 through the capacitance storage unit C.

More specifically, the touch-sensing element 120a of the embodiment includes a plurality of first electrode series 122a and a plurality of second electrode series 124a. Each of the first electrode series 122a includes a plurality of first touch electrodes 122a1 and a plurality of first connecting lines 122a2 connecting the first touch electrodes 122a1 in a series along a first direction D1. Each of the second electrode series 124a includes a plurality of second touch electrodes 124a1 and a plurality of second connecting lines 124a2 connecting the second touch electrodes 124a1 in a series along a second direction D2. The second electrode series 124a are insulated from the first electrode series 122a, and the first direction D1 intersects with the second direction D2. As shown in FIG. 1B, the first connecting lines 122a2 of the first electrode series 122a are insulated from the second connecting lines 124a2 by the insulation layer 160, and electrically connected to the adjacent first touch electrodes 122a1. Herein, the first electrode series 122a and the second electrode series 124a are made of metallic material, wherein the first touch electrodes 122a1 and the second touch electrodes 124a1 are mesh electrodes.

As shown in FIG. 1A and FIG. 1B, the capacitance storage unit C which is defined by the first electrode layer 150a, the insulation layer 160 and the second electrode layer 170a of the embodiment can serve as an electrostatic discharge (ESD) protection unit, wherein the first electrode layer 150a, the insulation layer 160 and the second electrode layer 170a are all disposed around the ground electrode 140 in annular shape. Therefore, as shown in FIG. 1B, this electrostatic discharge (ESD) protection unit is disposed around the light transmitting area 102 of the touch panel 100a. Herein, the second electrode layer 170a, the insulation layer 160 and the first electrode layer 150a are conformally disposed, and the insulation layer 160 is located between the first electrode layer 150a and the second electrode layer 170a. The ground electrode 140 is located at the outer side of the transmission lines 130, and the first electrode layer 150a and the second electrode layer 170a are located at the outer side of the ground electrode 140. The material of the first electrode layer 150a and the second electrode layer 170a is, for example, metal, alloy, a metal stacked layer, an alloy stacked layer, metal oxide or any combination thereof.

Herein, the first electrode layer 150a, the first touch electrodes 122a1 of the first electrode series 122a, and the second touch electrodes 124a1 and the second connecting lines 124a2 of the second electrode series 124a belong to the same layer. The second electrode layer 170a and the first connecting lines 122a2 of the first electrode series 122a belong to the same layer. Moreover, the insulation layer 160 located in the periphery area 104 (for example, the insulation layer 160 located between the first electrode layer 150a and the second electrode layer 170a in FIG. 1B) and the insulation layer 160 located in the light transmitting area 102 (for example, the insulation layer 160 located between the first connecting lines 122a2 and the second connecting lines 124a2 in FIG. 1B) belong to the same layer. Therefore, the first electrode layer 150a, the insulation layer 160 and the second electrode layer 170a are formed without performing any additional manufacturing step. Furthermore, the capacitance storage unit C, the ground electrode 140, the transmission lines 130 and the touch-sensing element 120 are covered by a protection layer 180, wherein a material of the protection layer 180 is silicon dioxide.

Furthermore, the substrate 110 of the present embodiment is a glass substrate, and the touch panel of the present embodiment further includes a decoration layer 190 disposed between the substrate 110 and the first electrode layer 150a, the substrate 110 and the ground electrode 140 and the substrate 110 and the transmission lines 130. The decoration layer 190 shields the opaque metal trace disposed thereon so as to improve the artistic appearance of the touch panel 100a.

The touch panel 100a of the embodiment can conduct an electro static discharge to the ground electrode 140 via the capacitance storage unit C. In addition to the storage of the electro static discharge, the capacitance storage unit C also can gradually conduct the electro static discharge to the ground electrode 140. Therefore, the instantaneous current can be prevented from impacting the ground electrode, and the electro static discharge can be dissipated through the ground electrode to protect the touch-sensing element.

It is worth mentioning that, the present invention is not intended to limit to the first electrode series 122a and the second electrode series 124a to the foregoing disposition. Please refer to the touch panel 100b of FIG. 1C, in other embodiments, the first connecting lines 122b2 of the first electrode series 122*b* of the touch-sensing element 120*b* are located on the substrate 110, and the second connecting lines 124*b*2 of the second electrode series 124*b* are disposed above the first connecting lines 122*b*2 via the insulation layer 160 so as to electrically insulate the first connecting lines 122*b*2 and the second connecting lines 124*b*2. The first electrode layer 150*a* and the first connecting lines 122*b*2 belong to the same layer, and the second electrode layer 170*a*, the first touch electrodes 122*b*1, the second touch electrodes (not illustrated) and the second connecting lines 124*b*2 belong to the same layer. The insulation layer 160 located between the first electrode layer 150*a* and the second electrode layer 170*a* and the insulation layer 160 located between the second connecting lines 124*b*2 and the first connecting lines 122*b*2 belong to the same layer. The above mentioned techniques are still belonged to a technical implementation of the present invention without departing from the spirit and scope of the present invention.

Furthermore, although the first electrode series 122*a*, 122*b* and the second electrode series 124*a*, 124*b* of the touch-sensing elements 120*a*, 120*b* embodied herein are made of metallic material, and the manufacturing processes of the first electrode layer 150*a*, the second electrode layer 170*a* and insulation layer 160 can be integrated with the manufacturing processes of the touch-sensing elements 120*a*, 120*b*, the material of the touch-sensing elements 120*a*, 120*b* is not limited in this invention. In yet other embodiment, please refer to the touch panel 100*c* of FIG. 1D, the touch-sensing element 120*c* is composed of the first electrode series 122*c* and the second electrode series 124*c*, and each of the first electrode series 122*c* includes the first touch electrodes 122*c*1 and the first connection lines 122*c*2 connecting the first touch electrodes 122*c*1 in a series, and each of the second electrode series 124*c* includes the second touch electrodes (not illustrated, please refer to FIG. 1A) and the second connecting lines 124*c*2 connecting the second touch electrodes in a series. The second electrode series 124*c* are insulated from the first electrode series 122*c*, and the first direction intersects with the second direction (please refer to FIG. 1A). The first connecting lines 122*c*2 of the first electrode series 122*c* are located in the substrate 110, and the second connecting lines 124*c*2 of the second electrode series 124*c* are located above the first connecting lines 122*c*2. Herein, the first touch electrodes 122*c*1 and the first connecting lines 122*c*2 of the first electrode series 122*c* of the touch-sensing element 120*c* and the second touch electrodes and the second connecting lines 124*c*2 of the second electrode series 124*c* are all made of transparent conductive material, and able to integrate with the manufacturing processes of the first electrode layer 150*a*, the second electrode layer 170*a* and the insulation layer 160. This technique is belonged to a technical implementation of the present invention without departing from the spirit and scope of the present invention.

Figure 1C:
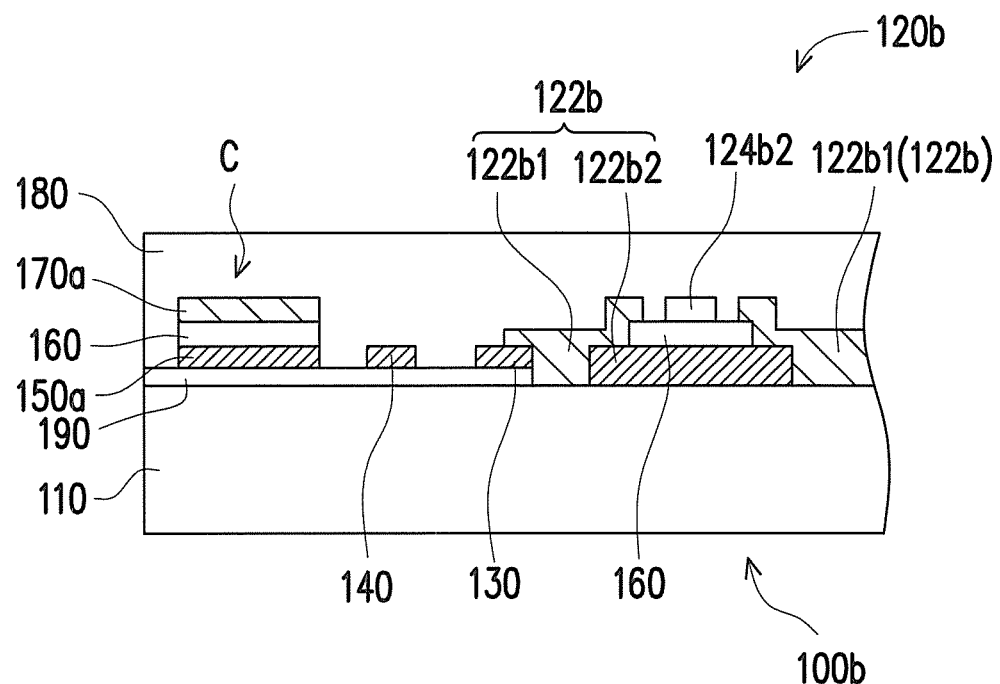
FIG. 1C is a cross-sectional view of a touch panel according to an embodiment of the invention.
Figure 1D:
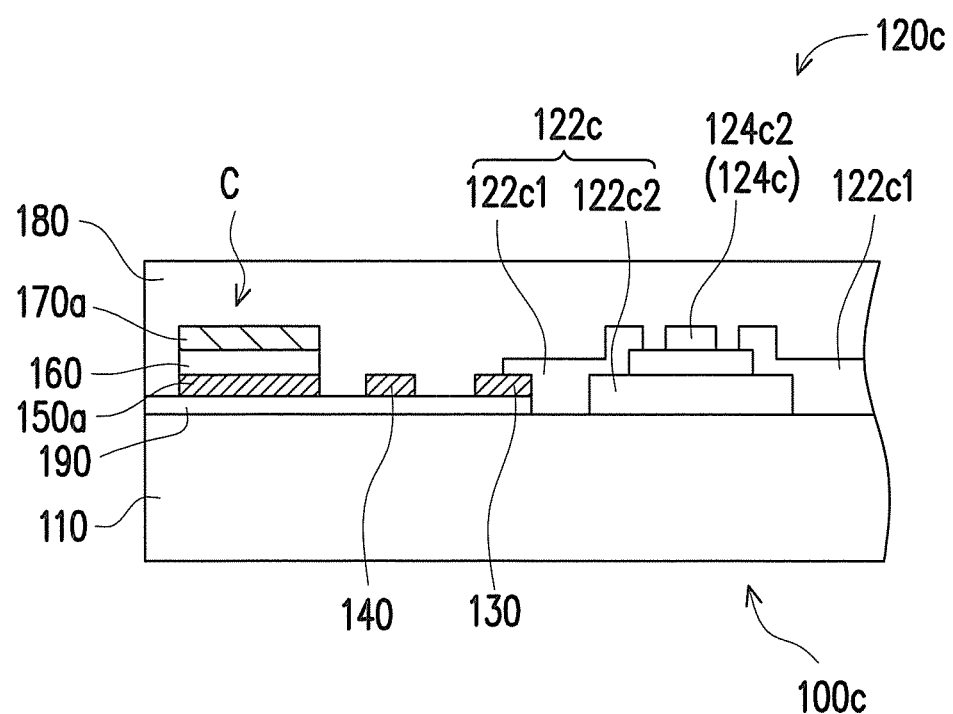
FIG. 1D is a cross-sectional view of a touch panel according to another embodiment of the invention.
Figure 1E:
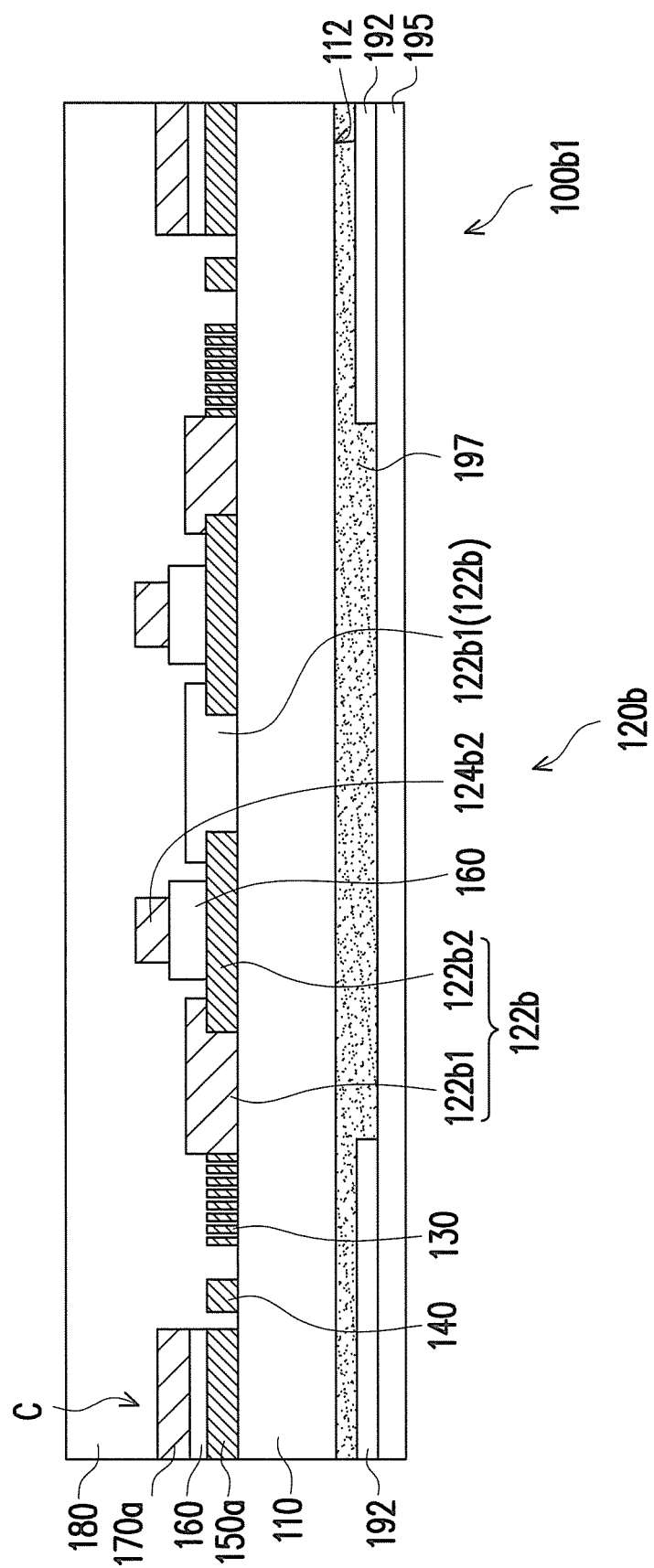
FIG. 1E is a cross-sectional view of a touch panel according to another embodiment of the invention.

Furthermore, in another embodiment, please refer to FIG. 1E, the main difference between the touch panel 100*b*1 of the embodiment and the touch panel 100*b* of FIG. 1C is that the decoration layer 192 of the embodiment is foamed on a cover plate 195, and not formed on the substrate 110, wherein the cover plate 195 is adhered to the surface 112 of the substrate 110 through an adhesive layer 197. At this time, the decoration layer 192 is located between the cover plate 195 and the adhesive layer 197, and an orthographic projection area of the first electrode layer 150*a*, the ground electrode 140 and the transmission lines 130 on the surface 112 of the substrate 110 is overlapped with an orthographic projection area of the decorative layer 192 on the surface 112 of the substrate 110.

Figure 1F:
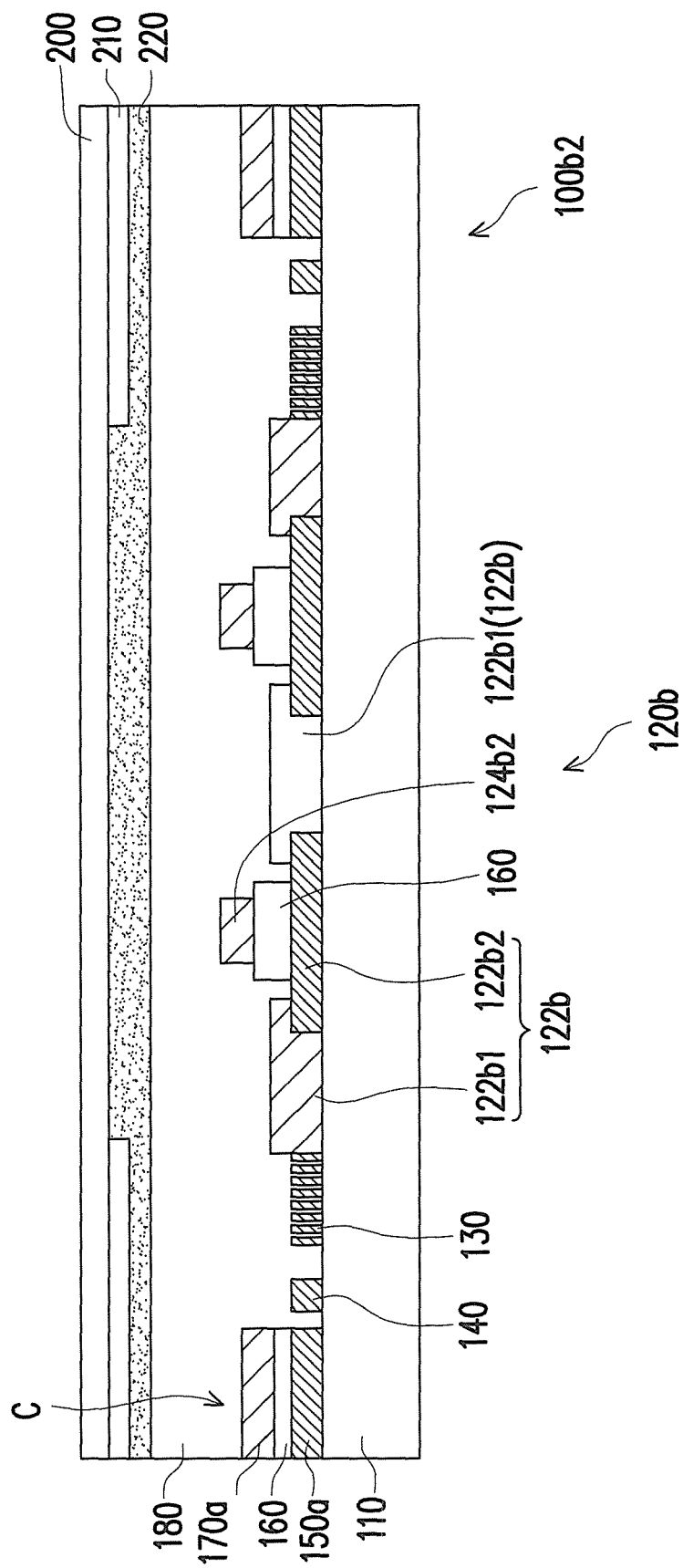
FIG. 1F is a cross-sectional view of a touch panel according to another embodiment of the invention.

In another embodiment, please refer to FIG. 1F, the main difference between the touch panel 100*b*2 of the embodiment and the touch panel 100*b* of FIG. 1C is that the decoration layer 210 is disposed on the cover plate 200, and the cover plate 200 is disposed on the protection layer 180 through a adhesive layer 220. Accordingly, the decoration layer 210 is located between the cover plate 200 and the adhesive layer 220, and an orthographic projection area of the first electrode layer 150*a*, the ground electrode 140 and the transmission lines 130 on the substrate 110 are overlapped with an orthographic projection area of the decorative layer 210 on the substrate 110.

The following embodiment uses the same reference numerals of the above mentioned embodiment for similar components, wherein the same reference numeral represents the same or similar component, and repeated description is omitted. For the omitted portions please refer to the above mentioned embodiment, and the following embodiment may not repeat thereafter.

Figure 2:
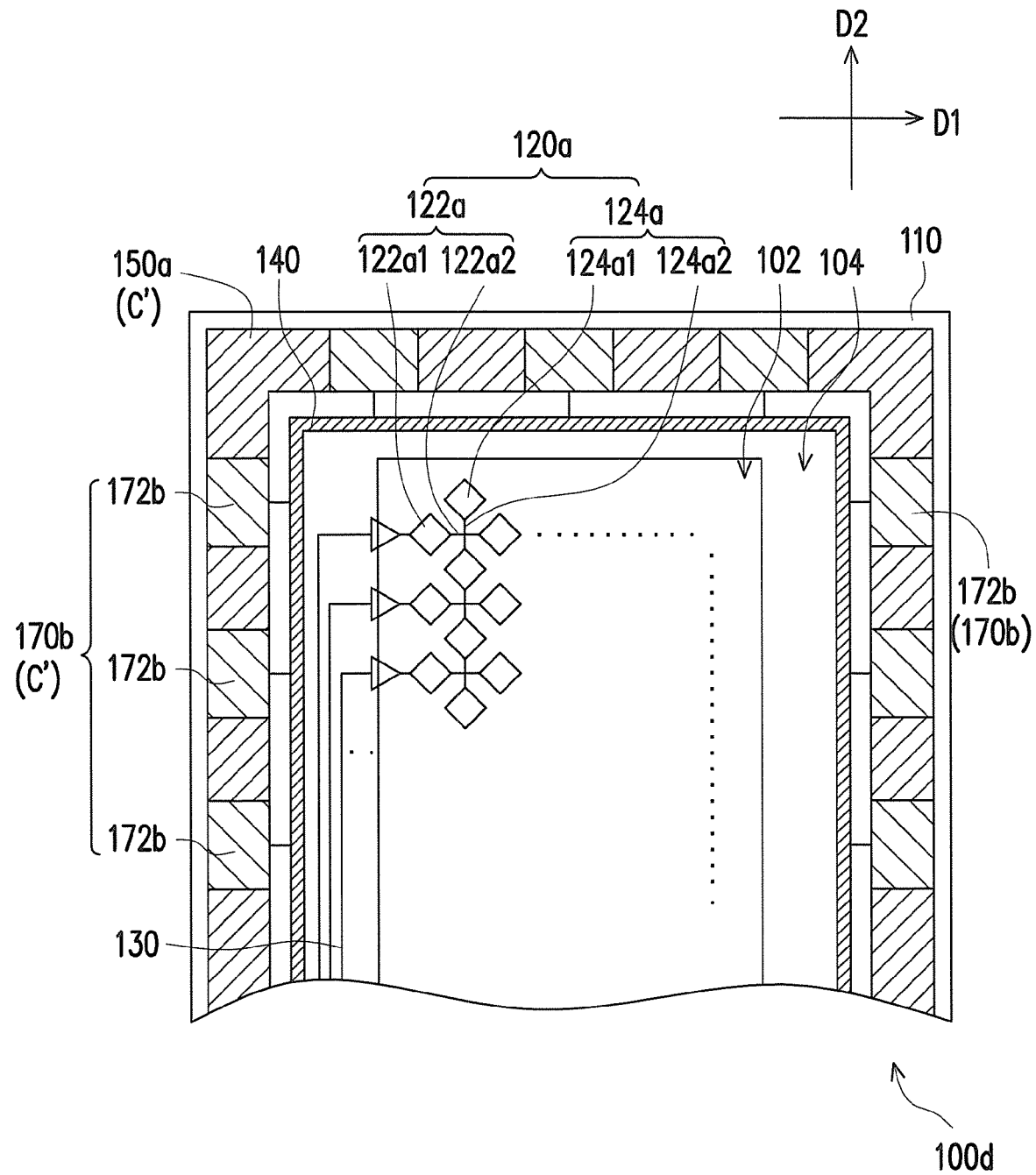
FIG. 2 is a schematic top view of a touch panel according to another embodiment of the invention.

FIG. 2 is a schematic top view of a touch panel according to another embodiment of the invention. For the convenience of explanation, illustrations of some components are omitted in FIG. 2. The touch panel 100*d* in the embodiment is similar to the touch panel 100*a* of FIG. 1A, and the difference is that the second electrode layer 170*b* are patterned to form a plurality of second electrodes 172*b*, wherein the second electrodes 172*b* are separated from each other and located around the ground electrode 140. Each of the second electrodes 172*b* and a portion of the underlying first electrode layer 150*a* form a plurality of capacitance storage units C' to storage the electro static discharge and gradually conduct the electro static discharge to the ground electrode 140. Therefore, the instantaneous current can be prevented from impacting the ground electrode, and the electro static discharge can be dissipated through the ground electrode to protect the touch-sensing element.

Figure 3:
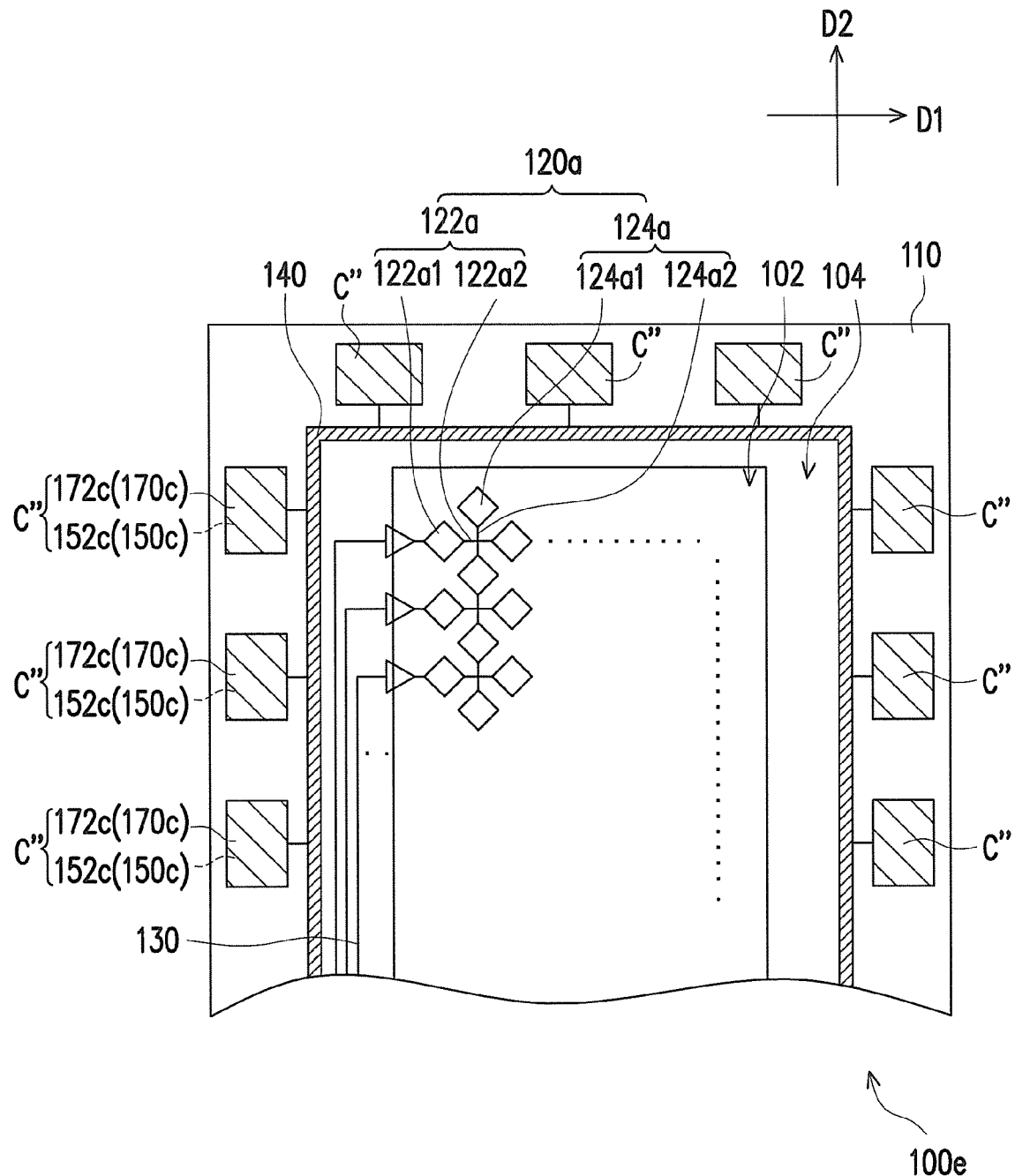
FIG. 3 is a schematic top view of a touch panel according to another embodiment of the invention.

FIG. 3 is a schematic top view of a touch panel according to another embodiment of the invention. For the convenience of explanation, illustrations of some components are omitted in FIG. 3. The touch panel 100*e* of the embodiment is similar to the touch panel 100*a* of FIG. 1A, and the difference is that the first electrode layer 150*c* are patterned to form a plurality of first electrodes 152*c*, wherein the first electrodes 152*c* are separated from each other and located around the ground electrode 140. The first electrodes 152*c* are respectively and electrically connected to the ground electrode 140. Moreover, the second electrode layer 170*b* are patterned to form a plurality of second electrodes 172*b*, wherein the second electrodes 172*b* are separated from each other and located around the ground electrode 140. Specially, the second electrodes 172*c* are corresponding to the first electrodes 152*c* and the second electrodes 172*c* and the first electrodes 152*c* are conformably disposed, so as to form a plurality of capacitance storage units C".

In view of the foregoing, the touch panel of the embodiment of the present invention can store and conduct the electro static discharge to the ground electrode through the capacitance storage unit formed by the first electrode layer, the insulation layer and the second electrode layer. Therefore, the instantaneous current can be prevented from impacting the ground electrode, and the electro static discharge can be dissipated through the ground electrode to protect the touch-sensing element. Accordingly, the touch panel of the present invention can have a better function of conducting the electro static discharge.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a substrate;
   a touch-sensing element disposed on the substrate;
   a plurality of transmission lines disposed on the substrate and electrically connected to the touch-sensing element;
   a ground electrode disposed on the substrate and surrounding the touch-sensing element and the transmission lines;
   a first electrode layer disposed on the substrate and located around the ground electrode, the first electrode layer electrically connected to the ground electrode;
   an insulation layer at least disposed on the first electrode layer; and
   a second electrode layer disposed on the insulation layer, wherein the second electrode layer, the insulation layer and the first electrode layer form at least one capacitance storage unit, so that an electro static discharge is conducted to the ground electrode through the capacitance storage unit.

2. The touch panel as claimed in claim 1, wherein the first electrode layer has an annular shape.

3. The touch panel as claimed in claim 2, wherein the second electrode layer has an annular shape.

4. The touch panel as claimed in claim 2, wherein the second electrode layer comprises a plurality of second electrodes.

5. The touch panel as claimed in claim 1, wherein the first electrode layer comprises a plurality of first electrodes.

6. The touch panel as claimed in claim 5, wherein the second electrode layer comprises a plurality of second electrodes corresponding to the first electrodes.

7. The touch panel as claimed in claim 1, wherein the material of the first electrode layer and the second electrode layer comprises metal, alloy, a metal stacked layer, an alloy stacked layer, metal oxide or any combination thereof.

8. The touch panel as claimed in claim 1, wherein the touch-sensing element comprises:
   a plurality of first electrode series, each of the first electrode series comprises a plurality of first touch electrodes and a plurality of first connecting lines connecting the first touch electrodes in a series along a first direction; and
   a plurality of second electrode series, each of the second electrode series comprises a plurality of second touch electrodes and a plurality of second connecting lines connecting the second touch electrodes in a series along a second direction, wherein the first direction intersects with the second direction, and the second connecting lines and the first connecting lines are insulated from each other.

9. The touch panel as claimed in claim 8, wherein the first connecting lines are disposed on the second connecting lines.

10. The touch panel as claimed in claim 9, wherein the first electrode layer, the first touch electrodes, the second touch electrodes and the second connecting lines belong to the same layer, and the second electrode layer and the first connecting lines belong to the same layer.

11. The touch panel as claimed in claim 8, wherein the first connecting lines are disposed on the substrate.

12. The touch panel as claimed in claim 11, wherein the first electrode layer and the first connecting lines belong to the same layer, and the second electrode layer, the first touch electrodes, the second touch electrodes and the second connecting lines belong to the same layer.

13. The touch panel as claimed in claim 8, wherein the first touch electrodes and the second touch electrodes are mesh electrodes.

14. The touch panel as claimed in claim 13, wherein the first electrode series and the second electrode series are made of metallic material.

15. The touch panel as claimed in claim 1, further comprising:
   a decoration layer, an orthographic projection area of the first electrode layer, the ground electrode and the transmission lines on the substrate are overlapped with an orthographic projection area of the decoration layer on the substrate.

* * * * *